United States Patent
Agresti

(10) Patent No.: US 10,479,252 B2
(45) Date of Patent: Nov. 19, 2019

(54) CUP HOLDER FOR A VEHICLE

(71) Applicants: Hyundai Motor Company, Seoul (KR); Kia Motors Corporation, Seoul (KR)

(72) Inventor: Manfredo Agresti, Bergheim (DE)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/018,832

(22) Filed: Jun. 26, 2018

(65) Prior Publication Data

US 2019/0168654 A1 Jun. 6, 2019

(30) Foreign Application Priority Data

Dec. 4, 2017 (DE) .......... 10 2017 221 806

(51) Int. Cl.
*B60N 3/10* (2006.01)
*D02G 3/32* (2006.01)

(52) U.S. Cl.
CPC .......... *B60N 3/108* (2013.01); *B60N 3/101* (2013.01); *D02G 3/32* (2013.01)

(58) Field of Classification Search
CPC .......... B60N 3/10; B60N 3/18; Y10S 224/926
USPC .............................................. 248/311.2, 313
See application file for complete search history.

(56) References Cited

U.S. PATENT DOCUMENTS

| | | | | |
|---|---|---|---|---|
| 5,054,733 A | * | 10/1991 | Shields | B60N 3/101 248/154 |
| 6,070,844 A | | 6/2000 | Salenbauch et al. | |
| 6,302,364 B1 | * | 10/2001 | Chiueh | B60N 3/10 206/545 |
| 7,213,793 B2 | * | 5/2007 | Sturt | B60N 3/106 224/281 |
| 7,413,154 B2 | * | 8/2008 | Harshman | B60N 3/106 224/542 |
| 9,174,799 B2 | * | 11/2015 | Virgen | B29C 45/0001 |
| 9,242,598 B2 | | 1/2016 | Mayer et al. | |
| 9,428,093 B2 | | 8/2016 | Kupina | |
| 2004/0021048 A1 | * | 2/2004 | Schaal | B60N 3/108 248/310 |
| 2009/0095865 A1 | | 4/2009 | Everhart et al. | |
| 2009/0173862 A1 | | 7/2009 | Lota | |
| 2012/0153113 A1 | | 6/2012 | Voigt et al. | |
| 2017/0144577 A1 | | 5/2017 | Oh et al. | |

* cited by examiner

*Primary Examiner* — Steven M Marsh
(74) *Attorney, Agent, or Firm* — Morgan, Lewis & Bockius LLP

(57) ABSTRACT

A cup holder may include a cup-shaped, substantially cylindrical or conical receiving portion having an open upper surface and a closed lower surface when disposed in the vehicle, the cup-shaped receiving portion being configured to receive a beverage container through the open upper face, and an elastic insert being attached to the cup-shaped receiving portion, the elastic insert being configured to hold respective beverage containers having a plurality of shapes and sizes.

13 Claims, 5 Drawing Sheets

CUP HOLDER FOR A VEHICLE

CROSS-REFERENCE TO RELATED APPLICATION

The present application claims priority to German Patent Application No. DE 102017221806.1 filed on Dec. 4, 2017, entire contents of which is incorporated herein for all purposes by this reference.

BACKGROUND OF THE INVENTION

Field of the Invention

The present invention relates to a cup holder for a vehicle.

Description of Related Art

Known cup holders typically are formed as a single or twin cup holder having a substantially cylindrical receiving portion with diameters ranging from 52 to 85 mm. The cup holders furthermore typically include a number of fingers or holding elements to be able to hold beverage containers that have a smaller diameter than an overall diameter of the receiving portion.

The holding elements are usually made of a plastic material and are spring-loaded such that they can be retracted for the receiving portion to fit beverage containers that are greater than a minimum diameter of beverage containers that can be held in the receiving portion.

Such related art cup holders have various disadvantages. For instance, beverage containers having a relatively small diameter or a relatively tall height cannot be securely held and are thus prone to tilt in the receiving portion when subjected to forces acting on the beverage container due to various driving conditions of the vehicle.

Furthermore, the related art cup holders are mostly designed to accommodate beverage containers having a round shape, whereas beverage containers having other shapes usually cannot be held securely by the holding elements.

US 2017/0144577 A1 may include a cup holder for a vehicle including an internal cup having a cylindrical shape opened at an upper surface thereof to receive a beverage container through the opened upper face.

Moreover, conventional cup holders have diameter limitations, depending on a size and mechanics of respective holding elements.

Consequently, there is a need to further improve the cup holder.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention relates to cup holder for a vehicle. The cup holder may include a cup-shaped, substantially cylindrical or conical receiving portion having an opened upper surface and a closed lower surface when disposed in the vehicle.

The receiving portion is configured to receive a beverage container through the opened upper face. The cup holder may further include an elastic insert being attached to the cup-shaped receiving portion, the elastic insert being configured to hold respective beverage containers having a plurality of shapes and sizes.

A further aspect of the present invention relates to a vehicle having a console, preferably a center console, disposed in a cabin of the vehicle and a cup holder integrated into the console.

The idea of the present invention is to replace the conventional retractable holding elements by the elastic insert being attached to the cup-shaped receiving portion, wherein the elastic insert is configured to hold respective beverage containers having a plurality of shapes and sizes.

In doing so, the hold ability of the cup holder is not limited to typically round-shaped beverage containers but can hold beverage containers of any shape securely. Due to providing the elastic insert, it is moreover possible to accommodate beverage containers having a plurality of shapes and sizes in the cup-shaped receiving portion of the cup holder.

According to an exemplary embodiment of the present invention, the elastic insert is formed of a textile fabric being fixed to an upper end portion and a lower end portion of the cup-shaped receiving portion. Due to the fact that the elastic insert is formed of a textile fabric having a defined elasticity, the elastic insert is configured for holding any type of beverage container securely, because the elastic insert is configured to adapt its shape to the shape of the beverage container, thus holding the beverage containers having surrounding surface-contact which advantageously prevents any tilting or rattling of the beverage container in the cup holder during typical operation of the vehicle.

According to another exemplary embodiment of the present invention, the cup-shaped receiving portion may include a first circumferential groove formed at the lower end portion and a second circumferential groove formed at the upper end portion. Thus, the cup-shaped receiving portion is configured for securely holding the elastic insert in the first and second circumferential groove.

According to another exemplary embodiment of the present invention, a first axial end portion and a second axial end portion of the elastic insert have an increased thickness respectively, wherein the first axial end portion of the elastic insert is inserted into the first circumferential groove of the cup-shaped receiving portion and the second axial end portion of the elastic insert is inserted into the second circumferential groove of the cup-shaped receiving portion.

Due to the first and second grooves being formed circumferentially around the cup-shaped receiving portion, the elastic insert can be held such that it extends more in the region of the first and second circumferential grooves than at a middle portion, thus being able to securely hold beverage containers of various shapes and sizes.

According to another exemplary embodiment of the present invention, the first circumferential groove and the second circumferential groove have a radially increasing thickness being configured to hold the first axial end portion and the second axial end portion of the elastic insert having an increased thickness.

In this way, a twisted or wrong positioning of the elastic insert in the first circumferential groove and/or the second circumferential groove can be prevented.

Due to providing the first axial end portion and the second axial end portion of the elastic insert with an increased thickness, they can be securely held and positioned in the circumferential grooves.

According to another exemplary embodiment of the present invention, a first diameter of the elastic insert at the first axial end portion and/or at the second axial end portion is greater than a second diameter of the elastic insert at a middle portion in an axial direction of the elastic insert.

This provides the advantage that the elastic insert is configured for adapting its shape to a respective shape of the beverage container being inserted into the cup-shaped receiving portion of the cup holder providing surface-contact between the elastic insert and the beverage container.

According to another exemplary embodiment of the present invention, the second diameter of the elastic insert at the middle portion is less than or equal to 40 mm, preferably 45 mm, wherein the elastic insert is extendable to a diameter of at least 105 mm. The extendability of the elastic insert thus allows the cup holder to accommodate beverage containers of virtually all commercially available sizes.

According to another exemplary embodiment of the present invention, the elastic insert is configured to adapt its shape to a shape of the beverage container providing surface-contact to respective surfaces of the beverage container.

The provision of the surface-contact allows for a homogeneous force distribution of the elastic insert to the beverage container thus providing an improved holding capability for beverage containers of all shapes and sizes.

According to another exemplary embodiment of the present invention, the elastic insert may include a knitting structure having at least one yarn material, wherein the at least one yarn material is formed of an elastic material or a non-elastic material. The knitting structure allows for the extendability of the elastic insert, wherein the yarns can be disposed with respect to each other in numerous different ways resulting in a defined optimal elasticity, in the width direction resulting in an improved holding capability of the elastic insert.

According to another exemplary embodiment of the present invention, the first yarn is formed of a cotton material and the second yarn is formed of a thermoplastic elastomeric material, Elastan, Spandex or Lycra. The choice of the materials provide the advantageous characteristics as far as the flexibility of the elastic insert is concerned.

According to another exemplary embodiment of the present invention, the cup-shaped receiving portion may include a top portion being formed by a console, a mid-portion being formed by a circumferential side wall and a bottom portion being formed by the closed lower face, wherein the top portion, the mid-portion and the bottom portion are integrally formed or are formed by discrete components connected to each other. The cup-shaped receiving portion can thus be integrated in any existing console and/or is configured to be configured to any kind of arrangement/package requirements.

According to another exemplary embodiment of the present invention, the cup holder is configured as a single or twin cup holder, wherein the cup holder is configured to hold beverage containers having one of a plurality of shapes, having a cylindrical, conical, cube or cuboid shape. Thus, not only beverage containers but also other objects including electronic devices, cigarettes, candy and bars, containers for spectacles or wallets can be securely held in the cup holder.

According to another exemplary embodiment of the present invention, the cup holder may include a first cup-shaped receiving portion and a second cup-shaped receiving portion, wherein the first cup-shaped receiving portion and the second cup-shaped receiving portion differ in diameter and/or are disposed offset to each other with respect to a longitudinal axis of the vehicle.

The cup holder can thus advantageously be designed to accommodate objects having very small dimensions up to objects having very large dimensions. Moreover, the shape of the cup holder can be designed in unconventional ways and thus advantageously also contributes to an internal styling of a cabin of the vehicle. Moreover, the cup holder can be designed in one of different colors, can have any kind of pattern, logos and/or symbols.

Furthermore, the yarn can be illuminated by a light source.

The herein described features of the cup holder are disclosed for use with any type of vehicle including a vehicle, a utility vehicle/commercial vehicle, a ship or an airplane. Alternatively, the cup holder may also be a stand-alone cup holder to be used as a household appliance or can e.g., be integrated in various furniture items.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

Unless indicated otherwise, like reference numerals or signs to the figures indicate like elements.

Figure 1:
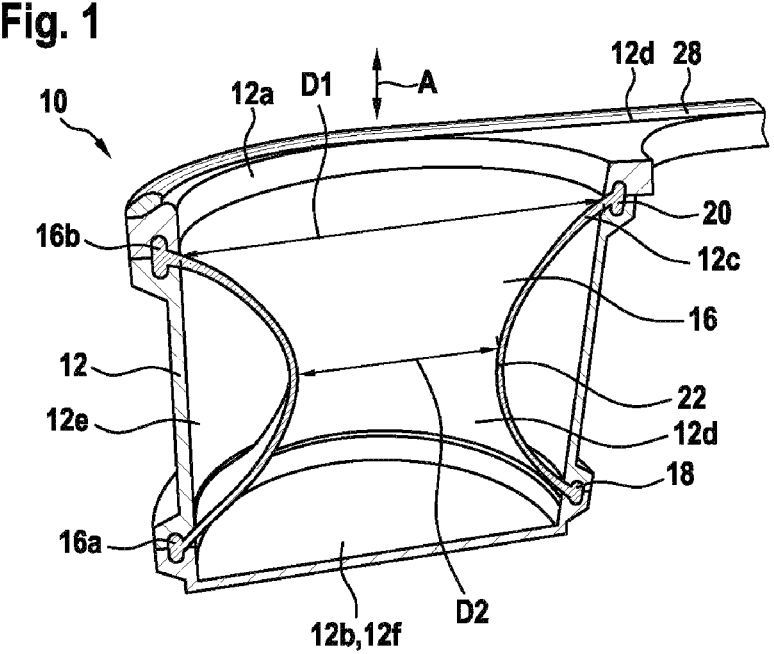
FIG. 1 shows a cross-sectional view of a cup holder for a vehicle according to an exemplary embodiment of the invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 shows a cross-sectional view of a cup holder for a vehicle according to an exemplary embodiment of the invention.

The cup holder 10 for the vehicle includes a cup-shaped, substantially cylindrical receiving portion 12. Alternatively, the cup-shaped receiving portion may have a conical shape, a cube shape or a cuboid shape.

The cup-shaped receiving portion 12 has an opened upper surface 12a and a closed lower surface 12b when disposed in the vehicle. The receiving portion 12 is configured to receive a beverage container (not shown in FIG. 1) through the opened upper surface 12a.

The cup holder 10 further includes an elastic insert 16 being attached to the cup-shaped receiving portion 12, the elastic insert 16 being configured to hold respective beverage containers 14 having a plurality of shapes and sizes.

The elastic insert 16 is formed of a textile fabric being fixed to an upper end portion 12c and a lower end portion 12d of the cup-shaped receiving portion 12.

The cup-shaped receiving portion 12 further includes a first circumferential groove 18 formed at the lower end portion 12d and a second circumferential groove 20 formed at the upper end portion 12c.

A first axial end portion 16a and a second axial end portion 16b of the elastic insert 16 have an increased thickness respectively, wherein the first axial end portion 16a of the elastic insert 16 is inserted into the first circumferential groove 18 of the cup-shaped receiving portion 12 and the second axial end portion 16b of the elastic insert 16 is inserted into the second circumferential groove 20 of the cup-shaped receiving portion 12.

The first circumferential groove 18 and the second circumferential groove 20 have a radially an increasing thickness being configured to hold the first axial end portion 16a and the second axial end portion 16b of the elastic insert 16 having an increased thickness.

The above-mentioned structure and configuration of the elastic insert 16 in the cup-shaped receiving portion 12 of the cup holder 10 is merely exemplary in nature, wherein the structure, shape, size and/or layout may be changed. For instance, according to the exemplary embodiment of the present invention, the elastic insert is held at the respective first and second axial end portion 16a, 16b in the respective circumferential grooves 18, 20 formed in the cup-shaped receiving portion 12.

Alternatively, the elastic insert 16 is not continuously formed to extend around the circumference of the cup-shaped receiving portion 12, i.e. does not may be formed having a substantially cylindrical shape but may be formed such that it only extends around a certain angular range of the cup-shaped receiving portion 12.

Furthermore, alternatively, it will be conceivable to attach the elastic insert 16 having a substantially cylindrical shape not all the way around the circumference of the cup-shaped receiving portion but instead at predetermined connection points around the circumference of the cup-shaped receiving portion 12.

Furthermore, if mounting the elastic insert 16 in the circumferential grooves 18, 20 formed in the cup-shaped receiving portion 12, it has to be noted that the first and second circumferential grooves 18, 20 of the cup-shaped receiving portion can be freely disposed at different specific positions in a height direction/axial direction of the cup holder 10 to accommodate specific design and/or package requirements of the cup holder.

A first diameter D1 of the elastic insert 16 at the first axial end portion 16a and at the second axial end portion 16b is greater than a second diameter D2 of the elastic insert 16 at a middle portion in an axial direction A of the elastic insert 16.

Alternatively, the first diameter D1 of the elastic insert 16 at the first axial end portion 16a or at the second axial end portion 16b can be formed to be greater than the second diameter D2 of the elastic insert 16 at the middle portion 22 in the axial direction A of the elastic insert.

Advantageously, at least the first diameter D1 of the elastic insert 16 at the second axial end portion 16b, i.e. at the top portion of the cup holder, when mounted to the cabin of the vehicle has a greater diameter than at the middle portion 22.

Furthermore, the cup-shaped receiving portion 12 includes a top portion 12g being formed by a console 28, a mid-portion 12e being formed by a circumferential side wall and a bottom portion 12f being formed by the closed lower surface 12b, wherein the top portion 12g, the mid-portion 12e and the bottom portion 12f are integrally formed.

Alternatively, the top portion 12g, the mid-portion 12e and the bottom portion 12f are formed by discrete components connected to each other.

Further alternatively, the elastic insert 16 can be extruded onto/into the cup-shaped receiving portion 12.

The cup holder 10 is configured as a twin cup holder, wherein in FIG. 1 only one of the two cup holders is shown. The cup holder is configured to hold beverage containers having a plurality of shapes including cylindrical, conical, cube or cuboid shapes.

Figure 2:
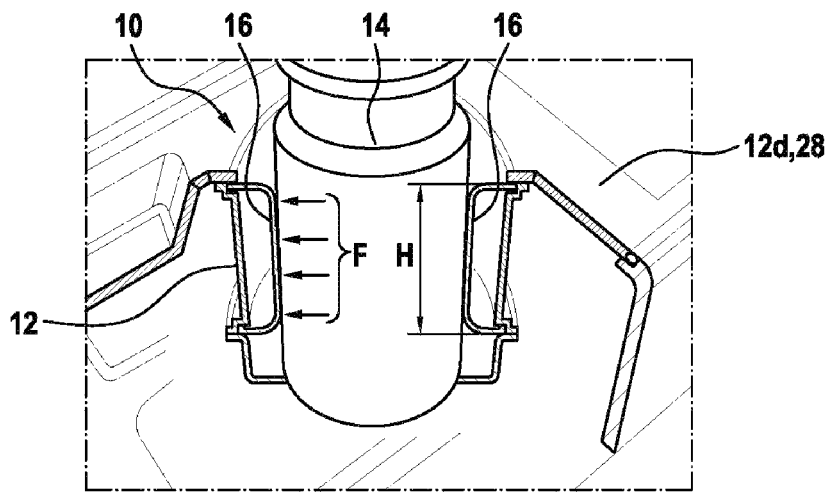
FIG. 2 shows a schematic view of the cup holder for the vehicle according to the exemplary embodiment of the present invention.

FIG. 2 shows a schematic view of the cup holder for the vehicle according to the exemplary embodiment of the present invention.

The beverage container 14 is inserted into the cup-shaped receiving portion 12 of the cup holder 10. The beverage container 14 has a relatively large size, its diameter almost completely filling the cup-shaped receiving portion 12 of the cup holder 10.

As can be seen in FIG. 2, the beverage container 14 is held by the elastic insert 16 having a large holding surface extending almost completely from top to bottom portion of the cup-shaped receiving portion 12 of the cup holder 10. This advantageously results in a homogeneous distribution of holding force F of the beverage container 14 by the elastic insert 16 in the cup-shaped receiving portion 12 of the cup holder 10.

A height H in which the beverage container 14 is held by the elastic insert 16 is indicated in FIG. 2 and spans almost an entire height of the cup-shaped receiving portion 12 thus contributing to an improved holding capability and a reduced tilting effect of the beverage container 14 due to an increased holding surface which is advantageous as far as beverage containers with a tall height are concerned which have a high center of gravity.

As a result, a distance of a center of gravity of the beverage container to a holding area is reduced compared to related art cup holders.

Such beverage containers are less prone to tilting when they are held across a larger holding surface as opposed to only having a point or line contact at respective holding elements.

Figure 3:
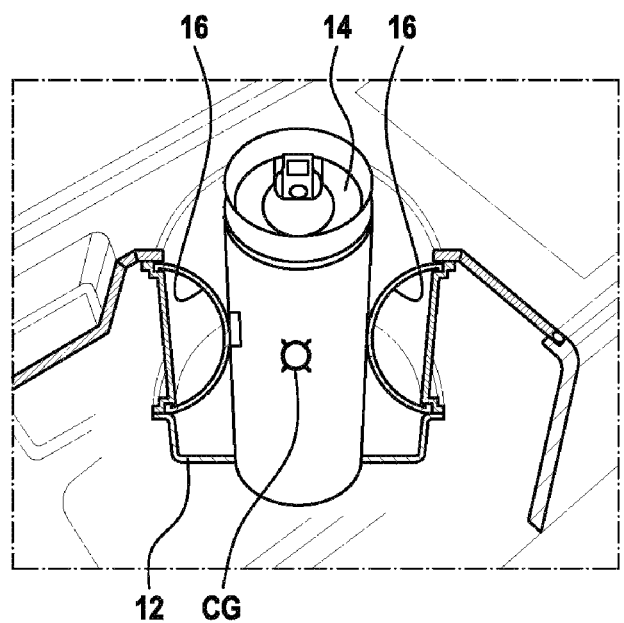
FIG. 3 shows a schematic view of the cup holder for the vehicle according to the exemplary embodiment of the present invention.

FIG. 3 shows a schematic view of the cup holder for the vehicle according to the exemplary embodiment of the present invention.

The beverage container indicated in FIG. 3 is a smaller beverage container, wherein the elastic inserts 16 are still configured for securely holding the smaller beverage container 14 having a surface-contact in the vicinity of the center of gravity CG of the beverage container 14.

Due to the fact that the center of gravity of the beverage container is located near to the holding surface of the elastic insert, a relatively low holding force is sufficient to securely hold the beverage container, even though its size is at the lower end portion of the sizes supported by the cup-shaped receiving portion 12 of the cup holder 10. Supported sizes of beverages extend from 40 mm or less, preferably 45 mm, to at least 105 mm. The elastic insert 16 thus provides an extendability/elasticity that can hold beverage containers of virtually all commercially available shapes and sizes.

Figure 4:
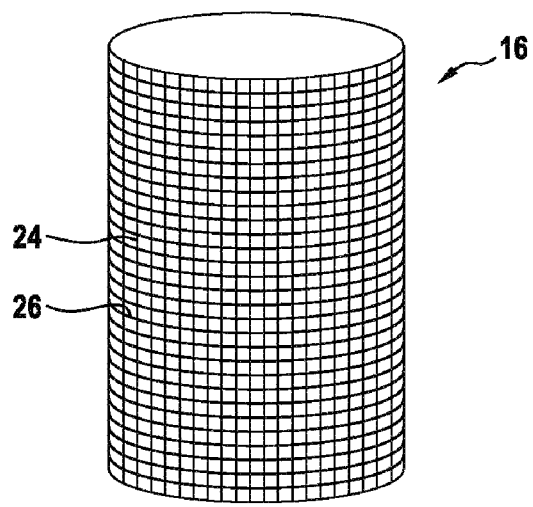
FIG. 4 shows an elastic insert of the cup holder for the vehicle according to the exemplary embodiment of the present invention.

FIG. 4 shows an elastic insert of the cup holder for the vehicle according to the exemplary embodiment of the present invention.

The elastic insert 16 of the present embodiment includes most of intermittently disposed yarns, wherein a first yarn 20 is formed of an elastic material, preferably a thermoplastic elastomeric material, Elastan or alternatively Spandex or Lycra.

The second yarn 26 is formed of a non-elastic material, preferably cotton. Such a two-yarn knitting structure provides an excellent width flexibility and to a lesser degree a length flexibility, thus being configured to optimally be accommodated in the cup-shaped receiving portion 12 of the cup holder and providing a sufficient degree of width flexibility to hold beverage containers in the defined range of sizes.

Figure 5A:
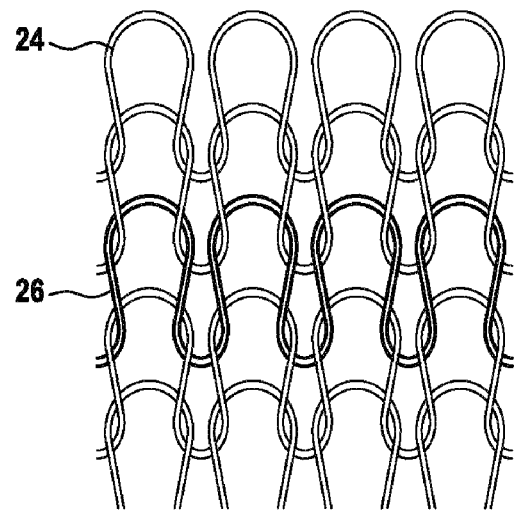
FIG. 5A, FIG. 5B, FIG. 5C and FIG. 5D show various knitting structures of the elastic insert of the cup holder for the vehicle according to the exemplary embodiment of the present invention.
Figure 5B:
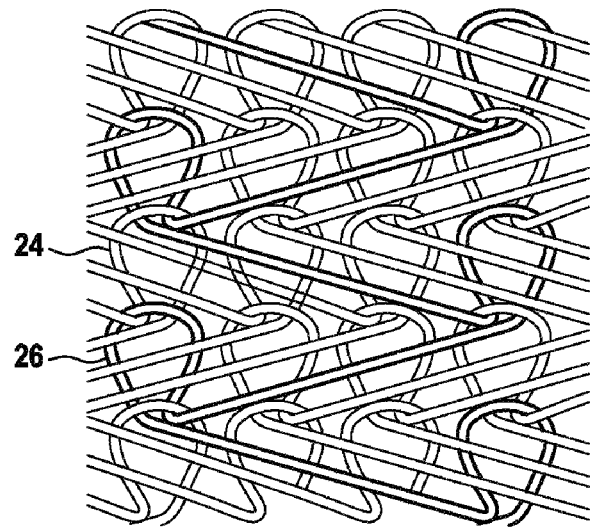

FIGS. 5A, 5B, 5C and 5D show various two-yarn knitting structures of the first yarn 24 and the second yarn 26, the first yarn 24 being formed of the elastic material and the second yarn 26 being formed of the non-elastic material. Each of the knitting structures shown in FIGS. 5A to 5D provides specific flexibility characteristics. For instance, the structure shown in FIG. 5A provides a good flexibility in both a width and height direction thereof, the structure in FIG. 5B provides a very tight knitting structure while still providing a good width flexibility.

Figure 5C:
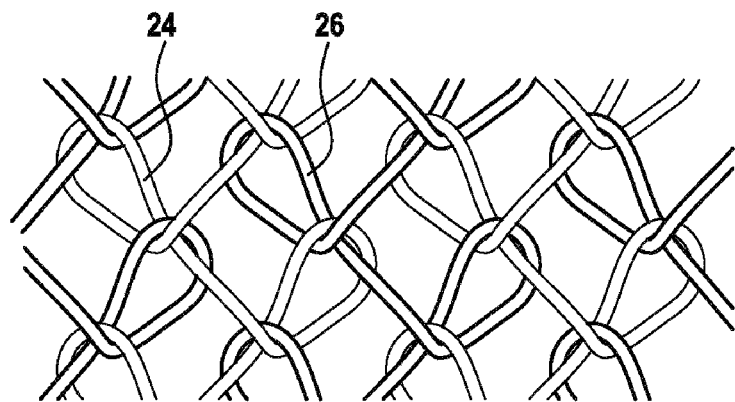
Figure 5D:
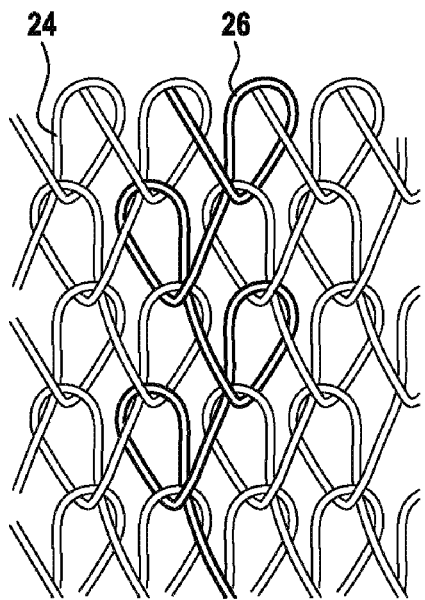

The structure shown in FIG. 5C equally provides a good height and width flexibility, whereas the structure shown in FIG. 5D provides an advantageous height/length flexibility. The first yarn 24 and the second yarn 26 may alternatively be disposed in an inverse pattern to the shown in FIGS. 5A to 5D or in such a way as to provide optimal height and/or width flexibility depending on specific requirements.

Figure 6:
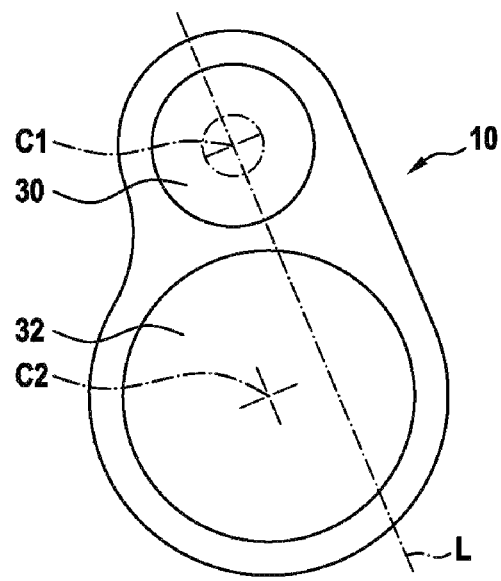
FIG. 6 shows a twin cup holder for the vehicle according to the exemplary embodiment of the present invention.

FIG. 6 shows a twin cup holder for the vehicle according to the exemplary embodiment of the present invention.

The cup holder 10 includes a first cup-shaped receiving portion 30 and a second cup-shaped receiving portion 32. The first cup-shaped receiving portion 30 and the second cup-shaped receiving portion 32 differ in diameter and are disposed offset to each other with respect to a longitudinal axis L of the vehicle.

As can be seen in FIG. 6, respective center points C1, C2 of the first cup-shaped receiving portion 30 and of the second cup-shaped receiving portion 32 are disposed offset from the longitudinal axis L of the vehicle. The arrangement of the first cup-shaped receiving portion 30 and the second cup-shaped receiving portion 32 indicated in FIG. 6 is merely of exemplary nature.

Alternatively, the arrangement of the first cup-shaped receiving portion 30 and the second cup-shaped receiving portion 32 can be configured to specific requirements.

Figure 7:
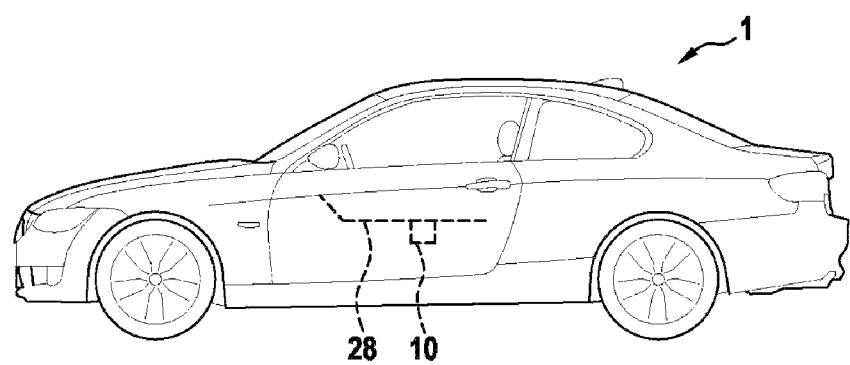
FIG. 7 shows a vehicle according to the exemplary embodiment of the present invention.

FIG. 7 shows a vehicle according to the exemplary embodiment of the present invention.

The vehicle 1 has a console 28, preferably a center console, disposed in a cabin of the vehicle 1. The vehicle 1 further includes the cup holder 10 in an exemplary embodiment of the present invention which is integrated in the console 28.

Although specific embodiments have been illustrated and described herein, it will be appreciated by those of ordinary skill in the art that a variety of alternate and/or equivalent implementations exist.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cup holder for a vehicle, the cup holder comprising:
 a cup-shaped, cylindrical or conical receiving portion having an open upper surface and a closed lower surface when disposed in the vehicle, the cup-shaped receiving portion being configured to receive a beverage container through the open upper surface; and
 an elastic insert being attached to the cup-shaped receiving portion, the elastic insert being configured to hold respective beverage containers having a plurality of shapes and sizes,
 wherein the elastic insert includes a textile fabric being fixed to an upper end portion and a lower end portion of the cup-shaped receiving portion.

2. The cup holder according to claim 1, wherein the cup-shaped receiving portion includes a first circumferential groove formed at the lower end portion and a second circumferential groove formed at the upper end portion.

3. The cup holder according to claim 2, wherein a first axial end portion and a second axial end portion of the elastic insert have an increased thickness respectively, and wherein the first axial end portion of the elastic insert is inserted into the first circumferential groove of the cup-shaped receiving portion and the second axial end portion of the elastic insert is inserted into the second circumferential groove of the cup-shaped receiving portion.

4. The cup holder according to claim 3, wherein the first circumferential groove and the second circumferential groove have a radially increasing thickness being configured to hold the first axial end portion and the second axial end portion of the elastic insert having an increased thickness.

5. The cup holder according to claim 3, wherein a first diameter of the elastic insert at the first axial end portion or at the second axial end portion is greater than a second diameter of the elastic insert at a middle portion in an axial direction of the elastic insert.

6. The cup holder according to claim 5, wherein the second diameter of the elastic insert at the middle portion is less than or equal to 40 mm, preferably 45 mm, and wherein the elastic insert is extendable to a diameter of at least 105 mm.

7. The cup holder according to claim 1, wherein the elastic insert is configured to adapt a shape thereof to a shape of the beverage containers providing surrounding contact to respective surfaces of the beverage containers.

8. A cup holder for a vehicle, the cup holder comprising;
   a cup shaped, cylindrical or conical receiving portion having an open upper surface and a closed lower surface when disposed in the vehicle, the cup-shaped receiving portion being configured to receive a beverage container through the open upper surface; and
   an elastic insert being attached to the cup-shaped receiving portion, the elastic insert being configured to hold respective beverage containers having a plurality of shapes and sizes,
   wherein the elastic insert includes a knitting structure having at least one yarn material, and wherein the at least one yarn material includes an elastic material or a non-elastic material.

9. The cup holder according to claim 8, wherein a yarn of the at least one yarn material includes a cotton material and another yarn of the at least one yarn material includes a thermoplastic elastomeric material, in Elastan, Spandex or Lycra.

10. The cup holder according to claim 1, wherein the cup-shaped receiving portion includes a top portion being formed by a console, a mid-portion being formed by a circumferential side wall and a bottom portion being formed by the closed lower surface, wherein the top portion, the mid-portion and the bottom portion are integrally formed or are formed by discrete components connected to each other.

11. The cup holder according to claim 1, wherein the cup holder is configured as a single or twin cup holder, and wherein the cup holder is configured to hold the beverage containers having one of a plurality of shapes, including a cylindrical, conical, cube or cuboid shape.

12. The cup holder according to claim 11 wherein the cup holder includes a first cup-shaped receiving portion and a second cup-shaped receiving portion, and wherein the first cup-shaped receiving portion and the second cup-shaped receiving portion differ in diameter or are disposed offset to each other with respect to a longitudinal axis of the vehicle.

13. The vehicle having a console including center console, disposed in a cabin of the vehicle and the cup holder according to claim 1 integrated into the console.

* * * * *